US008659995B2

(12) United States Patent
Varadhan et al.

(10) Patent No.: US 8,659,995 B2
(45) Date of Patent: Feb. 25, 2014

(54) TRANSITIVE PROBING FOR FAILURE DETECTION OF NETWORK INTERFACES

(75) Inventors: Sowmini Varadhan, Lexington, MA (US); Erik Nordmark, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 471 days.

(21) Appl. No.: 12/944,271

(22) Filed: Nov. 11, 2010

(65) Prior Publication Data

US 2012/0120811 A1 May 17, 2012

(51) Int. Cl.
*G01R 31/08* (2006.01)
(52) U.S. Cl.
USPC .......................................... 370/218; 370/244
(58) Field of Classification Search
USPC .......................................... 370/244, 242, 218
See application file for complete search history.

(56) References Cited

U.S. PATENT DOCUMENTS

| 6,052,733 A | 4/2000 | Mahalingam et al. |
| 2002/0027884 A1* | 3/2002 | Halme ........................ 370/253 |
| 2012/0250516 A1* | 10/2012 | Aggarwal et al. ............ 370/238 |

OTHER PUBLICATIONS

Sun Microsystems, Inc.: "Introducing IPMP," System Administration Guide: Network Interfaces and Network Virtualization, Chapter 7, Mar. 2009 (26 pages).
Memishian, P.: "IPMP Rearchitecture: High-Level Design Specification," Project Clearview I-Team, Solaris Networking, Sun Microsystems, Inc., Dec. 25, 2008 (62 pages).
Memishian, P.: "IPMP Rearchitecture Internals," Solaris Networking; Sun Microsystems, Inc; Jan. 2009 (37 pages).

* cited by examiner

Primary Examiner — Sai-Ming Chan
(74) Attorney, Agent, or Firm — Osha Liang LLP

(57) ABSTRACT

A system (including a processor, a host having a network multipath daemon, and multiple network interfaces) and method involving issuing, by an active interface, an Internet Protocol probe packet (IPPP) to a probe target, issuing, by an alternate interface, a transitive probe packet (TPP) to the active interface, where the alternate interface and the active interface belong to a broadcast domain. The system and method further involve awaiting, by the active interface, a responsive IPPP from the probe target, awaiting by the alternate interface, a responsive TPP from the active interface, and determining network conditions based upon receiving at least one of the responsive IPPP and the responsive TPP.

19 Claims, 6 Drawing Sheets

| Sender L2 Address 200 | Destination L2 Address 202 | Packet Type 204 | Sequence 206 | Timestamp 208 |

210

Transitive Probe Packet

TRANSITIVE PROBING FOR FAILURE DETECTION OF NETWORK INTERFACES

BACKGROUND

Network traffic is transmitted across a network, such as the Internet, from a sending system (e.g., a computer system) to a receiving system (e.g., a computer system) via a network interface card (NIC). In some cases, the sending and/or receiving computer systems may include multiple NICs, which it may use to send and/or receive network traffic.

SUMMARY

In general, in one aspect the invention relates to a method for detecting network conditions comprising issuing, by an active interface, an Internet Protocol probe packet (IPPP) to a probe target, issuing, by a first alternate interface, a first transitive probe packet (TPP) to the active interface, wherein the first alternate interface and the active interface belong to a broadcast domain, awaiting, by the active interface, a responsive IPPP from the probe target, awaiting, by the first alternate interface, a first responsive TPP from the active interface, and determining network conditions based upon receiving at least one selected from a group consisting of the responsive IPPP and the first responsive TPP.

In general, in one aspect the invention relates to a system, comprising at least one processor, a host comprising a network multipath daemon (NMD) configured to execute on the at least one processor, and a plurality of network interfaces comprising an active interface and an alternate interface, wherein the plurality of network interfaces enable the host to send and receive packets from a network and wherein the alternate interface and the active interface belong to a broadcast domain, wherein the NMD, when executed by the at least one processor, is configured to generate an Internet Protocol probe packet (IPPP) specifying a probe target, send, via a network stack on the host, the IPPP to the active interface, wherein the active interface issues the IPPP to the probe target, generate a transitive probe packet (TPP) specifying the active interface, send, bypassing the network stack on the host, the TPPP to the alternate interface, where the alternate interface sends the TPPP to the active interface, await a responsive IPPP from the probe target, await a responsive TPP from the active interface, and determine network conditions based upon receiving at least one selected from a group consisting of the responsive IPPP and the responsive TPP.

In general, in one aspect, the invention relates to a non-transitory computer readable medium comprising instructions, which when executed by a processor, performs a method for detecting network conditions, the method comprising issuing, by an active interface, an Internet Protocol probe packet (IPPP) to a probe target, issuing, by a first alternate interface, a first transitive probe packet (TPP) to the active interface, wherein the first alternate interface and the active interface belong to a broadcast domain, awaiting, by the active interface, a responsive IPPP from the probe target, awaiting, by the first alternate interface, a first responsive TPP from the active interface, and determining network conditions based upon receiving at least one selected from a group consisting of the responsive IPPP and the first responsive TPP.

Other aspects of the invention will be apparent from the following description and the appended claims.

BRIEF DESCRIPTION OF DRAWINGS

FIG. 2 shows a transitive probe packet in accordance with one or more embodiments of the invention.

DETAILED DESCRIPTION

Figure 1:
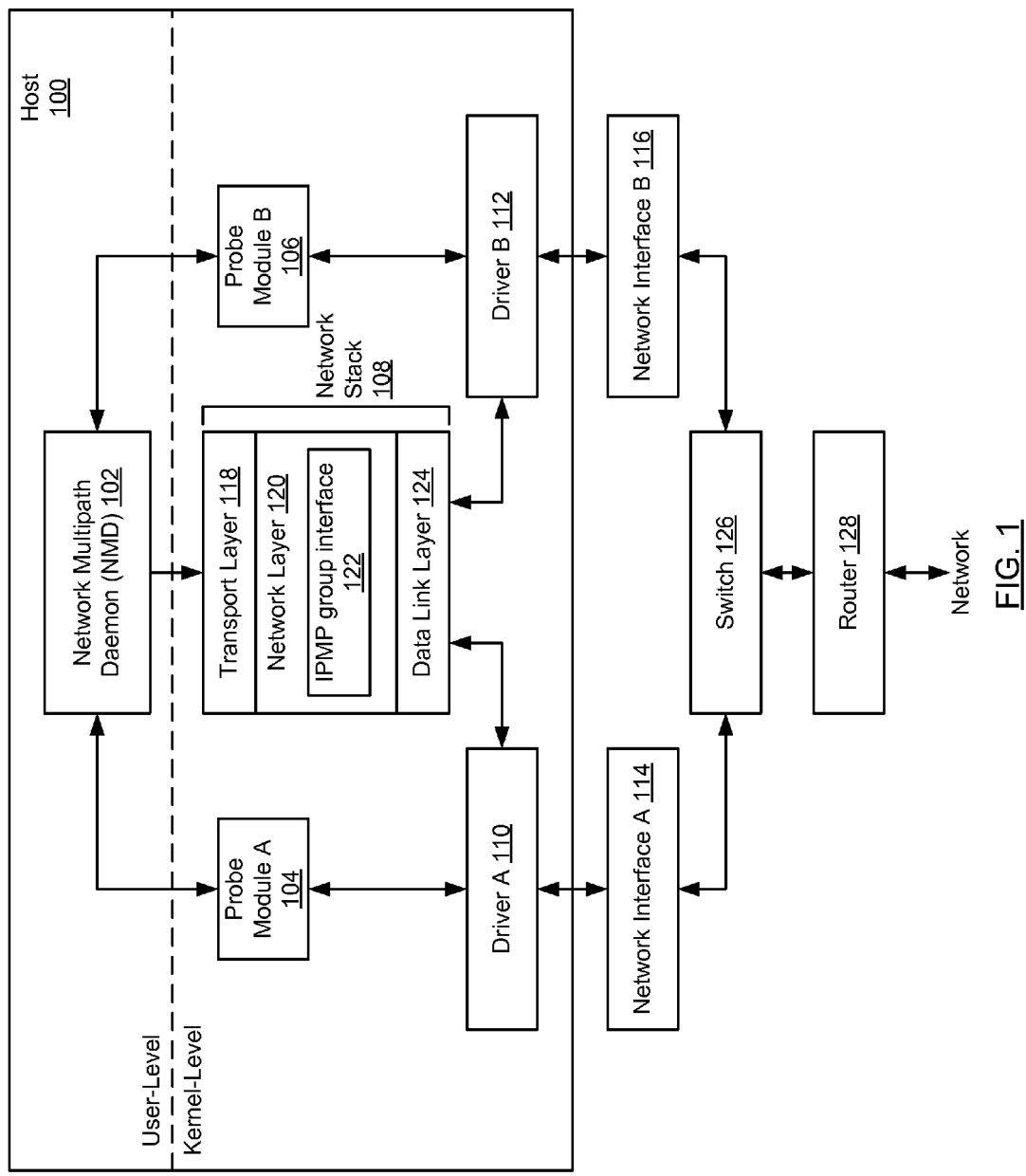
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to determining network conditions. More specifically, embodiments of the invention relate to using Internet Protocol probe packets (IPPP) and transitive probe packets (TPP) to determine network conditions. Further, in one or more embodiments of the invention, the network conditions relate to whether a given network interface is "ok" or has "failed".

FIG. 1 shows a system in accordance with one or more embodiments of the invention. The system includes a host (100) executing on a computer system (not shown). Though not shown in FIG. 1, the computer system includes one or more processor(s), associated memory (e.g., random access memory (RAM), cache memory, flash memory, etc.), a storage device (e.g., a hard disk, an optical drive such as a compact disk drive or digital video disk (DVD) drive, a flash memory stick, etc.), and numerous other elements and functionalities typical of today's computer systems. The processors are hardware devices for executing instructions. For example, each processor may correspond to a central processing unit, a processing core on a central processing unit, or another type of hardware device for processing instructions.

In addition, though not shown, the computer system may include input means, such as a keyboard, a mouse, or a microphone. Further, the computer system may include output means, such as a monitor (e.g., a liquid crystal display (LCD), a plasma display, or cathode ray tube (CRT) monitor). Those skilled in the art will appreciate that many different types of computer systems exist, and the aforementioned input and output means may take other forms. Generally speaking, the computer system includes at least the minimal processing, input, and/or output means necessary to practice embodiments of the invention.

Returning to FIG. 1, the host (100) implements a user-level and a kernel-level. In the user-level, the host executes a network multipath daemon (NMD) (102). The NMD (102) is configured to generate and issue transitive probe packets (TPPs) and IP probe packets (IPPPs). Further, the NMD (102) is configured to receive responsive TPPs and IPPPs and use the responsive TPPs and IPPPs to determine network conditions. In one embodiment of the invention, the network conditions include, but are not limited to, (i) determining whether a given network interface is currently able to send and receive data packets; (ii) for each network interface, determining to which other network interfaces the particular network interface can send data packets to and receive data packets from; (iii) estimating the round-trip time (including the appropriate adjustments for statistical variances) for TPPs; (iv) estimating possible load conditions at the sender and receiver that may impact the responsiveness of sender/receiver. In one embodiment of the invention, a data packet is a packet that includes a transport layer protocol header, a network layer protocol header, and a data payload.

Returning to FIG. 1, the NMD (102) is configured to send TPPs to the probe modules (104, 106) and IPPPs to the network stack (108). In one embodiment of the invention, the network stack (108) includes a transport layer (118), a network layer (120), and a data link layer (124). In one embodiment of the invention, the transport layer is configured to perform transport layer processing. Transport layer processing corresponds to functionality to manage the transfer of data packets on the network (e.g., functionality to support Transmission Control Protocol, User Datagram Protocol, Stream Control Transmission Protocol (SCTP), etc.).

In one embodiment of the invention, the Network layer is configured to perform Network layer processing. Network layer processing corresponds to functionality to manage data packet addressing and delivery on a network (e.g., functionality to support Internet Protocol (IP) (including, but not limited to, IPv4 and IPv6), Address Resolution Protocol (ARP), Internet Control Message Protocol (ICMP), etc.).

In one embodiment of the invention, the network interfaces in a broadcast domain are collectively represented by a virtual interface referred to as an IPMP group interface (122). In one embodiment of the invention, the IPMP group interface (122) is associated with one or more IP addresses, which are used by user-level applications (not shown), the NMD (102), and kernel-level processes to send and receive data packets on the network. The IPMP group interface (122) also includes functionality to send data packets to the network interfaces that belong to the corresponding IPMP group. From the perspective of the host, the IPMP group interface (122) is treated as a single network interface even though the corresponding IPMP group may include more than one network interface.

In one embodiment of the invention, an IPMP group is a set of network interfaces on the same broadcast domain (though not necessarily all connected to the same host). In one embodiment of the invention, a broadcast domain is a logical division of a network, in which all network interfaces in the broadcast domain may communicate with each other using broadcast messages at the data link layer. In one embodiment of the invention, any network interface connected to the same Ethernet repeater or switch is a member of the same broadcast domain. Further, any network interface connected to the same set of inter-connected switches/repeaters is a member of the same broadcast domain.

In one embodiment of the invention, the data link layer (124) is configured to implement data link protocols including, but not limited to, Ethernet and Point-to-Point Protocol. The data link layer (124) is configured to receive data packets and IPPPs from the network layer and to forward these data packets, using the appropriate data link layer protocols, to the appropriate drivers (110, 112).

Returning to FIG. 1, in one embodiment of the invention, the probe modules (104, 106) are configured to: (i) send TPPs received from the NMD (102) unaltered to the corresponding driver (110, 112), (ii) change the content of the packet type field in the TPP from "request" to "reply" for TPPs received by the probe module from the corresponding driver to generate responsive TPPs, (iii) send the responsive TPPs to the corresponding driver, and (iv) forward TPPs that include a packet type field with a value of "reply" to the NMD. Those skilled in the art will appreciate that other values for the packet type field may be used to convey "request" and "reply" without departing from the invention.

In one embodiment of the invention, each driver (110, 112) operates in Layer 2 of the host (as defined by the Open Systems Interconnection (OSI) model). Further, each driver is configured to: (i) receive packets from the probe modules (104, 106) and from the network stack (108), and to send such packets the corresponding network interface (114, 116) and (ii) to receive packets from the corresponding network interface and forward such packets to the network stack (108) or the probe module (106).

In one embodiment of the invention, a network interface is an IP interface that may be used by the host to send and receive data packets. Examples of IP interfaces include, but are not limited to, physical network interfaces, virtual network interfaces, and IP tunnel interfaces. Each network interface in the IPMP group may be designated as an active interface or an alternate interface. Further, the IPMP group may include one or more active interfaces and one or more alternate interfaces. An active interface is a network interface in the IPMP group that is associated with at least one IP address. The active interface is able to send and receive data using the IP address. An alternate interface is a network interface in the IPMP group that is not associated with an IP address. The alternate interface is able to send data packets using any IP address associated with the IPMP group, but is not able to receive data packets.

Each network interface in an IPMP group is associated with a status. The status is either (i) ok or (ii) fail. A status of "ok" for an active interface indicates that the particular network interface is able to send and receive data packets. A status of "fail" for an active interface indicates that the particular network interface is unable send and receive data packets. A status of "ok" for an alternate interface indicates that the particular network interface is able to send data packets. A status of "fail" for an alternate interface indicates that the particular network interface is unable to send data packets. Those skilled in the art will appreciate that designations other than "ok" and "fail" may be used to indicate the status of the network interfaces without departing from the invention.

In one embodiment of the invention, a switch (virtual or physical) includes functionality to route data packets, IPPPs, and TPPs using layer 2 protocols. In one embodiment of the invention, the router (virtual or physical) includes functionality to route data packets and IPPPs using layer 3 protocols.

Those skilled in the art will appreciate that the invention is not limited to the system shown in FIG. 1. Further, while the FIG. 1 shows only two network interfaces, a single switch, and a single router, the invention may be implemented using additional network interfaces, additional switches, and additional routers. One or more of the aforementioned components shown in FIG. 1 may be implemented as a process in software (i.e., virtual components) or as physical components. For example, the network interfaces, the switch, and the router may be implemented as physical components or as virtual components.

FIG. 2 shows a transitive probe packet in accordance with one or more embodiments of the invention. In one embodiment of the invention, the transitive probe packet (TPP) (210) includes (i) a sender L2 address (200) field, (ii) a destination L2 address (202) field, (iii) a packet type (204) field; (iv) a sequence (206) field, and (v) a timestamp (208) field.

In one embodiment of the invention, the sender L2 address (200) field includes the L2 address (e.g., a Media Access Control (MAC) address) of the alternate interface that is sending the TPP. In one embodiment of the invention, the destination L2 address (202) field includes the L2 address (e.g., a Media Access Control (MAC) address) of the destination network interface (i.e., an L2 address of the active interface or another alternate interface). In one embodiment of the invention, the packet type (204) field includes information to indicate whether the packet type is a request or a response. In one embodiment of the invention, the sequence (206) field includes a sequence number, which is used to identify the TPP from other TPPs issued by the NMD as well as determine the order in which a particular TPP was issued relative to the other TPPs that were issued. In one embodiment of the invention, the timestamp (208) field includes the time at which TPP was created by the NMD.

Those skilled in the art will appreciate that the content and order of the TPP packet may change without departing from the scope of the invention, provided that the TPP only uses layer 2 addresses to route the TPPs.

Figure 3:
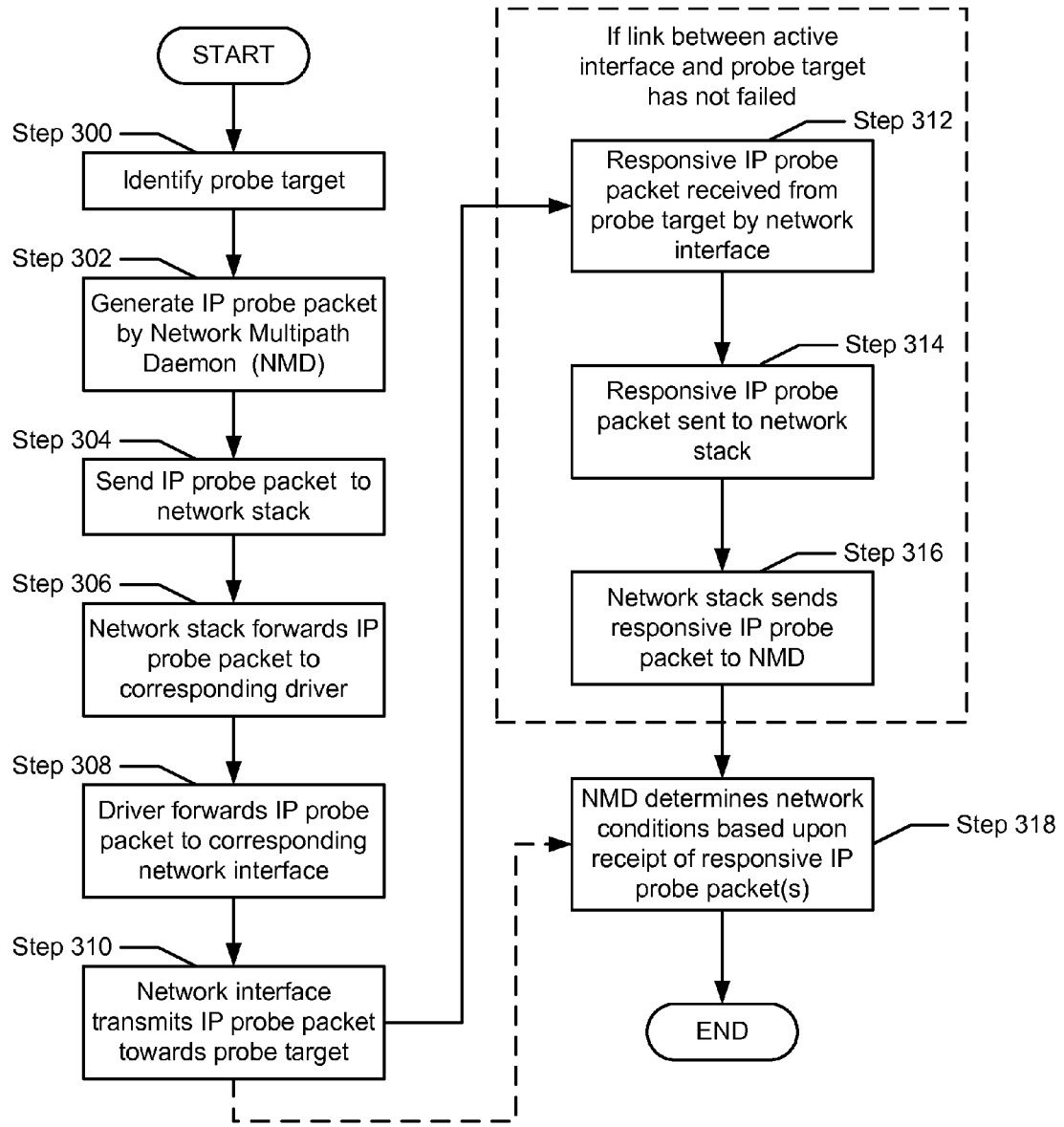
FIGS. 3-4 show flowcharts in accordance with one or more embodiments of the invention.
Figure 4:
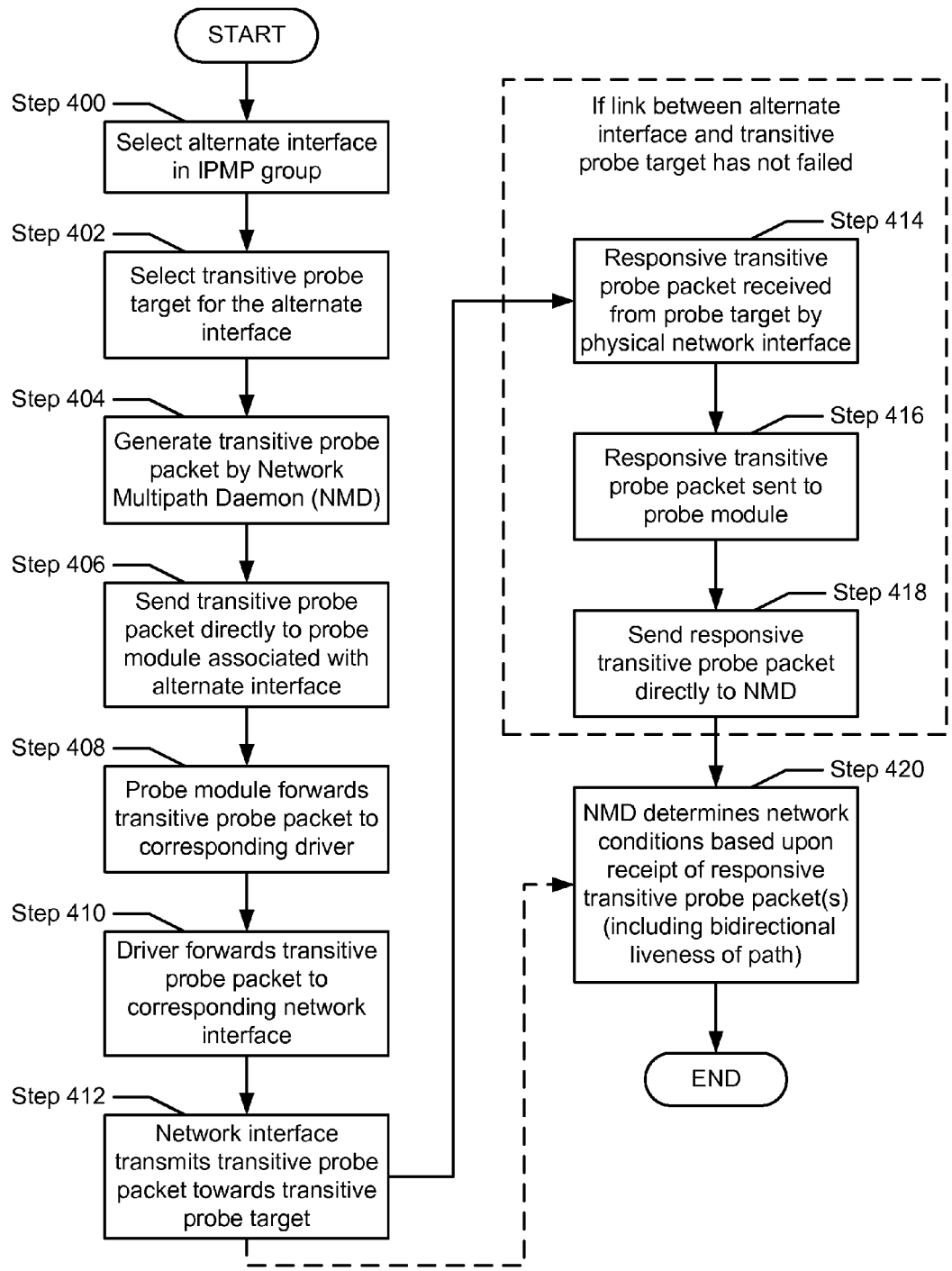

FIGS. 3-4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 3 shows a flowchart for issuing an IP probe packet in accordance with one or more embodiments of the invention. In Step 300, the NMD identifies the probe target. In one embodiment of the invention, the probe target is a network device that is external to the host and is associated with an IP address. In one embodiment of the invention, the probe target is a router. In Step 302, the IPPP is generated by the NMD. In one embodiment of the invention, the IPPP includes an IP address (i.e., source IP address) of the IPMP group to which the active interface belongs and the IP address of the probe target (i.e., the destination IP address). In one embodiment of the invention, the IPPP is an ICMP Echo Request packet.

In Step 304, the IPPP is sent from the NMD to the network stack. In Step 306, after the IPPP is processed by the network stack, the network stack forwards the resulting IPPP to the corresponding driver (i.e., the driver associated with the active interface). In Step 308, the driver forwards the IPPP received from the network stack to the network interface, in particular, the active interface. In Step 310, the network interface transmits the packet to towards the probe target, which is specified in the IPPP.

Once the IPPP is issued, the NMD awaits a response from the probe target. If a responsive IPPP is not received, then Steps 312-316 are not performed and the process proceeds to Step 318. However, if a responsive IPPP is received, the process proceeds to Step 312.

In Step 312, a responsive IPPP is received by the active interface. In one embodiment of the invention, the responsive IPPP is generated (or otherwise created) and sent by the probe target back to the active interface. In one embodiment of the invention, a responsive IPPP packet is a ICMP response packet. In Step 314, the responsive IP probe packet is sent, via the corresponding driver, to the network stack. In Step 316, the network stack sends the responsive IPPP packet to the NMD.

In Step 318, the NMD determines network conditions based upon receipt of responsive IP probe packet(s). In one embodiment of the invention, the NMD determines the network conditions based on the whether or not a responsive IPPP is received by the active interface. Further, the NMD may also determine network conditions based upon whether responsive TPPs are received by the alternate interfaces (as discussed in FIG. 4).

Referring to FIG. 4, FIG. 4 shows a flowchart for issuing transitive probe packets in accordance with one or more embodiments of the invention. In Step 400, an alternate interface in an IPMP group is selected by the NMD. In Step 402, the transitive probe target is selected from the IPMP group. In one embodiment of the invention, the transitive probe target is either an active interface or another alternate interface in the IPMP group (i.e., the same IPMP group to which the alternate interface selected in Step 400 belongs).

In Step 404, a TPP is generated by the NMD. In one embodiment of the invention, the TPP includes the Layer 2 address of the alternate interface (i.e., the alternate interface selected in Step 400) and the Layer 2 address of the transitive probe target). In addition, the TPP may also include a sequence number, a packet type, and a timestamp (as discussed above with respect to FIG. 2). In one embodiment of the invention, the value in the packet type field is set to "request" (or a value indicating that the TPP is a request).

In Step 406, the TPP is sent directly to the corresponding probe module, thereby bypassing the network stack. In Step 408, the probe module forwards the TPP to the driver corresponding to network interface (i.e., the alternate interface selected in Step 400). In Step 410, the driver forwards the TPP to the corresponding network interface. In Step 412, the network interface transmits the TPP towards the transitive probe target using the Layer 2 address of the probe target.

Once the TPP is issued, the NMD awaits a response from the transitive probe target. If a responsive TPP is not received, then Steps 414-418 are not performed and the process proceeds to Step 420. However, if a responsive TPP is received, the process proceeds to Step 414. In Step 414, a responsive TPP is received by the alternate interface (i.e., the alternate interface selected in Step 400). In Step 416, the responsive TPP is sent, via the corresponding driver, to the corresponding probe module. In Step 418, probe module sends the responsive TPP to the NMD.

In Step 420, the NMD determines network conditions based upon receipt of responsive TPP(s). In one embodiment of the invention, the NMD determines the network conditions based on whether or not a responsive TPP is received by the active interface. Further, the NMD may also determine network conditions based upon whether responsive IPPPs are received by the active interface (as discussed in FIG. 3).

In one embodiment of the invention, the NMD issues one or more TPPs to every other network interface in the IPMP using one or more of the steps shown in FIG. 4. In one or more embodiments of the invention, Step 420 may not be performed until the NMD has issued and received (or confirmed non-receipt) of responsive TPPs. Further, Step 420 may not be performed until the NMD has issued and received (or confirmed non-receipt) of responsive IPPP(s).

In one embodiment of the invention, the NMD may determine that the active interface has failed when the NMD issues a set number of IPPPs within a first time period and does not receive any responsive IPPPs within a second time period, which follows (and potentially overlaps with) the first time period. For example, the NMD confirms that an active interface has failed when 10 IPPPs are issued to the same probe target within a one minute period and no response is received within a one-minute time period following the issuance of the last IPPP.

In one embodiment of the invention, the NMD may determine that an alternate interface has failed when the NMD issues a set number of TPPs within a first time period and does not receive any responsive TPPs within a second time period, which follows (and potentially overlaps with) the first time period.

Those skilled in the art will appreciate that the flowcharts shown in FIGS. 3-4 may be performed in parallel. More specifically, the NMD may generate IPPPs for the active interface to send while concurrently generating TPPs for each of the alternate interfaces to send to all other network interfaces (active and alternate) in the IPMP group.

Further, in one embodiment of the invention, the NMD may generate multiple IPPPs and multiple TPPs in order to determine network conditions. In such cases, there may be multiple IPPPs sent to the same probe target and multiple TPPs sent to the same network interface (active or alternate).

The following section describes an example in accordance with one or more embodiments of the invention. The example is included to illustrate various embodiments of the invention and is not intended to limit the invention.

Figure 5A:
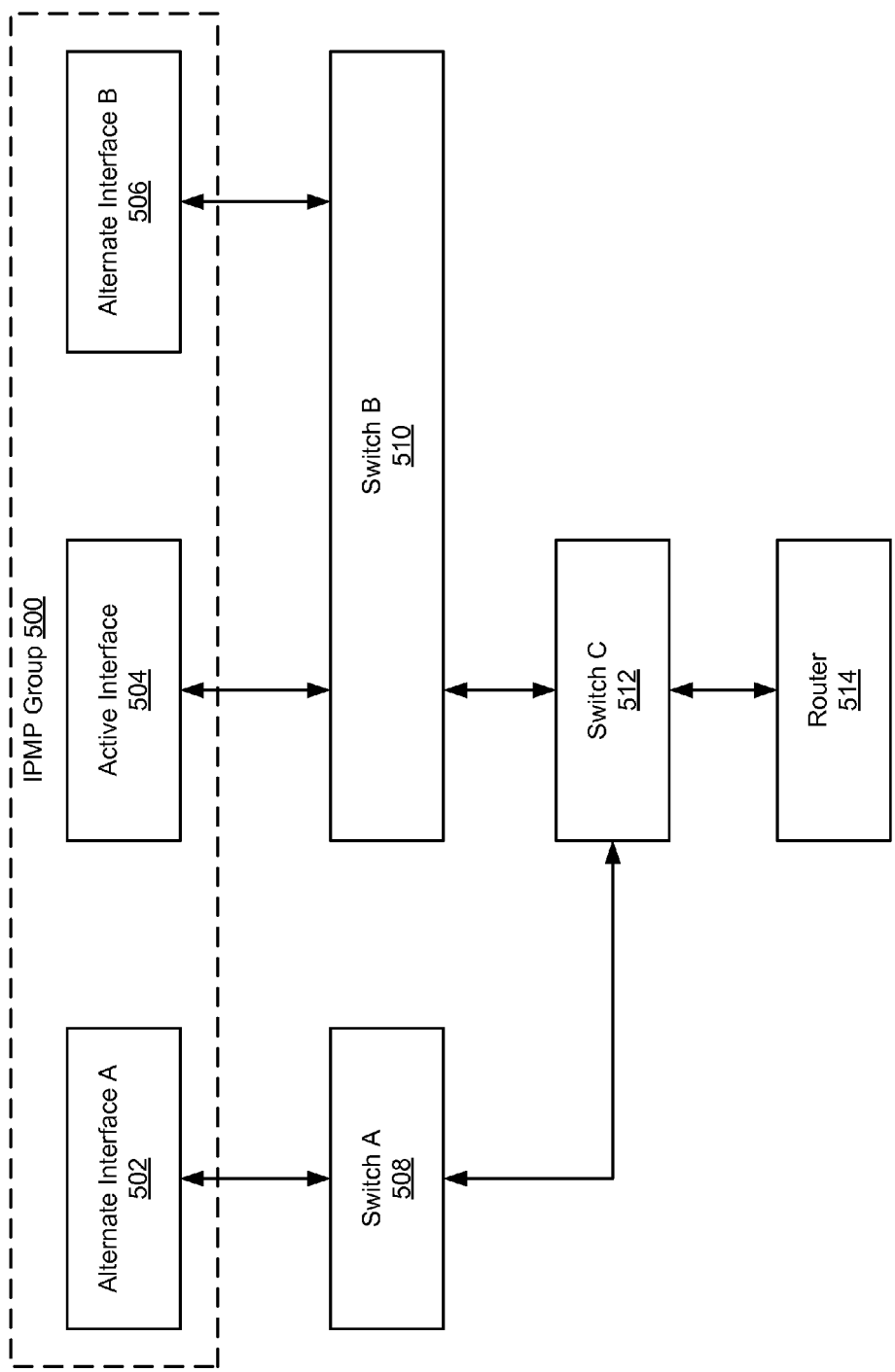
FIGS. 5A-5B show an example in accordance with one or more embodiments of the invention.
Figure 5B:
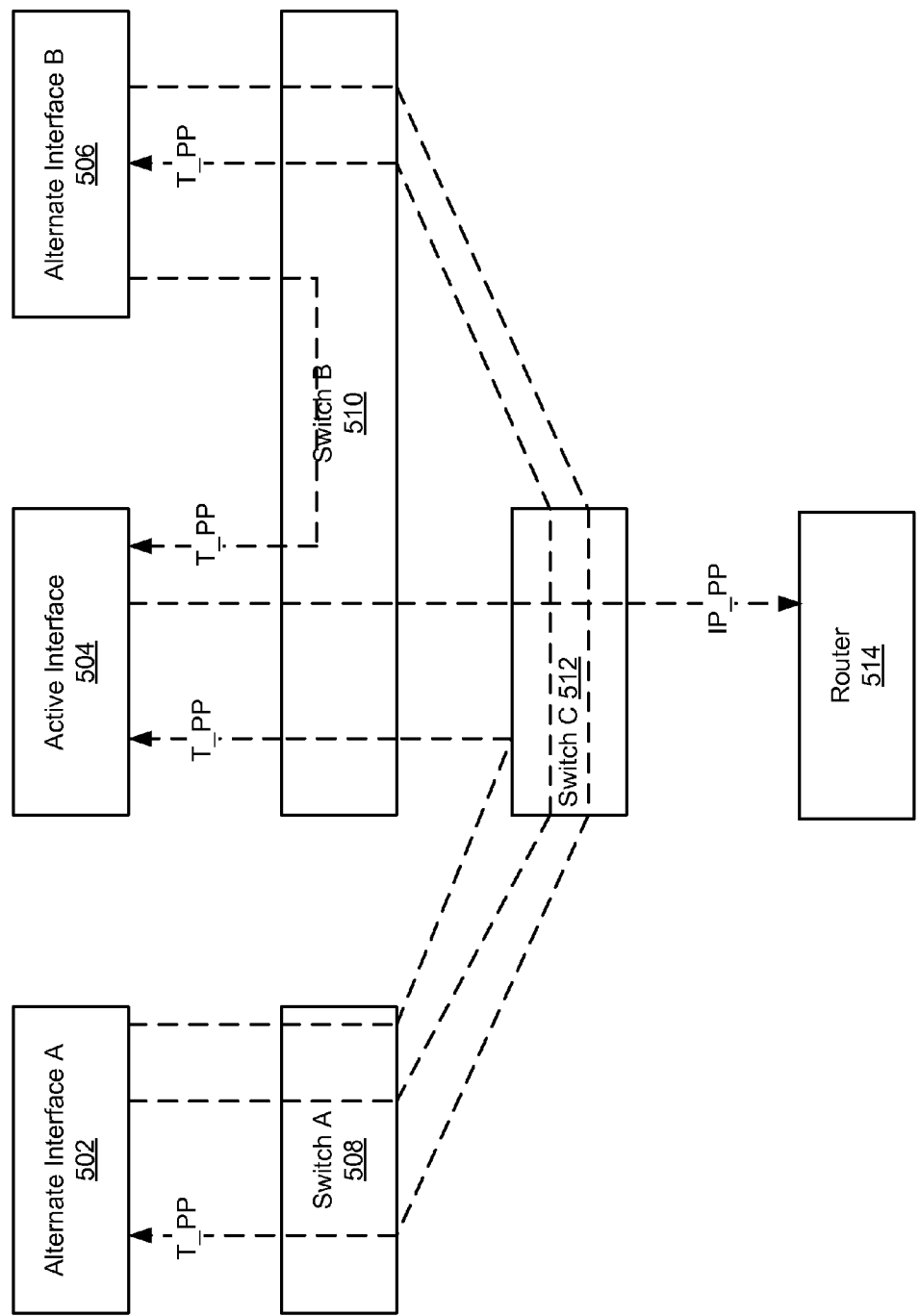

FIGS. 5A-5B show an example in accordance with one or more embodiments of the invention. Referring to FIG. 5A, the host (not shown) includes an IPMP group (500), which includes three network interfaces (502, 504, 506). Of the three network interfaces, one network interface is designated as the Active Interface (504), while the remaining two network interfaces are Alternate interfaces (502, 506). Alternate Interface A (502) is connected to Switch A (508). Active Interface (504) and Alternate Interface B (506) are connected to Switch B (510). Further, Switch A (508) and Switch B (510) are connected to Switch C (512). Finally, Switch C (512) is connected to a Router (514). Though not shown in FIG. 5A, the Router (514) is connected to a network (e.g., a LAN, WAN, etc.).

Referring to FIG. 5B, in order to determine the status of a given network interface and to which other network interface(s) in the IPMP group a particular interface is connected, the following IPPPs and TPPs may be issued: (i) at least one IPPP is issued from the Active Interface (504) to the router (514) using an IP address of the IPMP group that is bound to the Active Interface and the IP address of the router; (ii) at least one TPP is issued from Alternate Interface A (502) to the Active Interface (504); (iii) at least one TPP is issued from Alternate Interface A (502) to Alternate Interface B (506); (iv) at least one TPP is issued from Alternate Interface B (506) to the Active Interface (504); and (v) at least one TPP is issued from Alternate Interface B (506) to Alternate Interface A (502).

Based whether responsive IPPPs and TPPs are received by the appropriate network interfaces, the NMD (not shown) can determine the status of a network interface as well as the current connectivity between the various network interfaces in the IPMP group. Consider the following scenarios in which one or more of the switches or network interfaces fail and the resulting network conditions the NMD may determine based on the receipt (or non-receipt of) responsive IPPPs or TPPs.

Scenario 1

Consider a scenario in which the connection between Switch A (508) and Switch C (512) is broken. In such a scenario, Alternate Interface A (502) will not receive any responsive TPPs. However, the Active Interface (504) will continue to have a status of "ok" as the Active Interface (504) can continue to communicate with the router (514). Further, Alternate Interface B (506) will continue to have a status of "ok" as Alternate Interface B (506) will be able to communicate with the Active Interface (504). Based on this above, the NMD may also determine that both switch B (510) and switch C (512) are operational but that switch A (508) is not operational.

Scenario 2

Consider a scenario in which the connection between Switch B (510) and Switch C (512) is broken. In such a scenario, Alternate Interface A (502) will not receive any responsive TPPs. Further, the Active Interface (504) will not receive any responsive IPPPs. However, Alternate Interface B (506) will be able to send TPPs to and receive responsive TPPs from the Active Interface (504) because switch B (510) is operational. Based on this above, the NMD may also determine that the Active Interface (504) (which currently has a failed status) and Alternate Interface B (506) (which currently has a failed status) constitute an "island set" as they are able to communicate with each other. In such cases, the NMD may conclude there is an error upstream from Switch B (i.e., the connectivity to switch B from the network interfaces in the island set is working properly but there is an error on the other side of Switch B). Further, the NMD may continue to issue IPPPs via the Active Interface (504) in order to determine when the error upstream has been fixed.

Embodiments of the invention enable detection of network conditions using a combination of TPPs and IPPPs. Further, because the TPPs only use Layer 2 addresses for routing between network interfaces, embodiments of the invention are able to ascertain the status of a given network interface without requiring each network interface to include a test IP address. Further, the TPPs enable the NMD to determine to which network interfaces each network interface in the IPMP group is connected. This connective information also allows that NMD to determine the presence of island sets, which may be used to identify potential errors upstream from the network interfaces. Further, embodiments of the invention allow an active interface to determine that it can send and receive packets (i.e., bidirectional reachability) using the IPPPs. Further, embodiments of the invention allow alternate interfaces to determine that they can send and receive packets (i.e., bidirectional reachability) using the TPPs.

Software instructions, when executed by a processor(s), to perform embodiments of the invention may be stored on a non-transitory computer readable medium such as a compact disc (CD), a diskette, a tape, memory, or any other non-transitory computer readable medium.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting network conditions comprising:
   issuing, by an active interface, an Internet Protocol probe packet (IPPP) to a probe target;
   issuing, by a first alternate interface, a first transitive probe packet (TPP) to the active interface, wherein the first alternate interface and the active interface belong to a broadcast domain and wherein the first TPP does not include an IP address of the first alternate interface;
   awaiting, by the active interface, a responsive IPPP from the probe target;
   awaiting, by the first alternate interface, a first responsive TPP from the active interface; and
   determining network conditions based upon receiving at least one selected from a group consisting of the responsive IPPP and the first responsive TPP.

2. The method of claim 1, further comprising:
issuing, by the first alternate interface, a second TPP to a second alternate interface, wherein the second alternate interface belongs to the broadcast domain;
issuing, by the second alternate interface, a third TPP to the first alternate interface;
awaiting, by the first alternate interface, a second responsive TPP from the second alternate interface; and
awaiting, by the second alternate interface, a third responsive TPP from the first alternate interface,
wherein determining the network conditions is further based upon receiving at least one selected from a group consisting of the second responsive TPP and the third responsive TPP.

3. The method of claim 2, further comprising:
issuing, by the second alternate interface, a fourth TPP to the active interface; and
awaiting, by the second alternate interface, a fourth responsive TPP from the active interface,
wherein determining the network conditions is further based upon receiving the fourth responsive TPP.

4. The method of claim 1, wherein the IPPP comprises an IP address that is bound to the active interface.

5. The method of claim 1, wherein the first TPP is sent to the active interface using only a layer 2 address of the alternate interface and a layer 2 address of the active interface.

6. The method of claim 1, wherein the probe target is a router.

7. A system, comprising:
at least one processor;
a host comprising a network multipath daemon (NMD) configured to execute on the at least one processor; and
a plurality of network interfaces comprising an active interface and an alternate interface, wherein the plurality of network interfaces enable the host to send and receive packets from a network and wherein the alternate interface and the active interface belong to a broadcast domain,
wherein the NMD, when executed by the at least one processor, is configured to:
generate an Internet Protocol probe packet (IPPP) specifying a probe target,
send, via a network stack on the host, the IPPP to the active interface, wherein the active interface issues the IPPP to the probe target,
generate a transitive probe packet (TPP) specifying the active interface, wherein the TPP does not include an IP address of the alternate interface,
send, bypassing the network stack on the host, the TPP to the alternate interface, where the alternate interface sends the TPP to the active interface,
await a responsive IPPP from the probe target,
await a responsive TPP from the active interface, and
determine network conditions based upon receiving at least one selected from a group consisting of the responsive IPPP and the responsive TPP.

8. The system of claim 7, wherein the TPP comprises a layer 2 address of the alternate interface, a layer 2 address of the active interface, and does not include an IP address of the alternate interface.

9. The system of claim 8, wherein the TPP further comprises a sequence field and a timestamp field, wherein the sequence field is used by the NMD to identify the TPP and the timestamp field comprises a timestamp of when the TPP is generated by the NMD.

10. The system of claim 9, wherein the network conditions are determined, at least in part, on the sequence field and the timestamp field.

11. The system of claim 7, wherein the probe target is a router, wherein TPP is transmitted to the active interface using a switch, and wherein the IPPP is transmitted to the router via the switch.

12. The system of claim 7, wherein the host is configured to use the active interface to send and receive data packets from the network.

13. The system of claim 12, wherein the host is configured to use the alternate interface to only send data packets to the network.

14. The system of claim 7, wherein the NMD is executing in a user-level of the host.

15. The system of claim 7, wherein at least one of the plurality of network interfaces is a virtual network interface.

16. The system of claim 7, wherein at least one of the plurality of network interfaces is an IP interface.

17. A non-transitory computer readable medium comprising instructions, which when executed by a processor, performs a method for detecting network conditions, the method comprising:
issuing, by an active interface, an Internet Protocol probe packet (IPPP) to a probe target;
issuing, by a first alternate interface, a first transitive probe packet (TPP) to the active interface, wherein the first alternate interface and the active interface belong to a broadcast domain and wherein the first TPP does not include an IP address of the first alternate interface;
awaiting, by the active interface, a responsive IPPP from the probe target;
awaiting, by the first alternate interface, a first responsive TPP from the active interface; and
determining network conditions based upon receiving at least one selected from a group consisting of the responsive IPPP and the first responsive TPP.

18. The non-transitory computer readable medium in claim 17, the method further comprising:
issuing, by the first alternate interface, a second TPP to a second alternate interface, wherein the second alternate interface belongs to the broadcast domain;
issuing, by the second alternate interface, a third TPP to the first alternate interface;
issuing, by the second alternate interface, a fourth TPP to the active interface;
awaiting, by the first alternate interface, a second responsive TPP from the second alternate interface;
awaiting, by the second alternate interface, a third responsive TPP from the first alternate interface; and
awaiting, by the second alternate interface, a fourth responsive TPP from the active interface,
wherein determining the network conditions is further based upon receiving at least one selected from a group consisting of the second responsive TPP, the third responsive TPP, and the fourth responsive TPP.

19. The non-transitory computer readable medium in claim 17, wherein the first TPP is sent to the active interface using only a layer 2 address of the alternate interface and a layer 2 address of the active interface.

* * * * *

UNITED STATES PATENT AND TRADEMARK OFFICE
CERTIFICATE OF CORRECTION

PATENT NO.        : 8,659,995 B2                                  Page 1 of 1
APPLICATION NO.   : 12/944271
DATED             : February 25, 2014
INVENTOR(S)       : Varadhan et al.

It is certified that error appears in the above-identified patent and that said Letters Patent is hereby corrected as shown below:

In the Specification

In column 1, line 41, delete "TPPP" and insert -- TPP --, therefor.

In column 1, line 42, delete "TPPP" and insert -- TPP --, therefor.

Signed and Sealed this
First Day of July, 2014

Michelle K. Lee
*Deputy Director of the United States Patent and Trademark Office*